(No Model.)
W. C. MACKINNEY.
DRIVING GEAR FOR DRYING ROLLS.
No. 503,380. Patented Aug. 15, 1893.
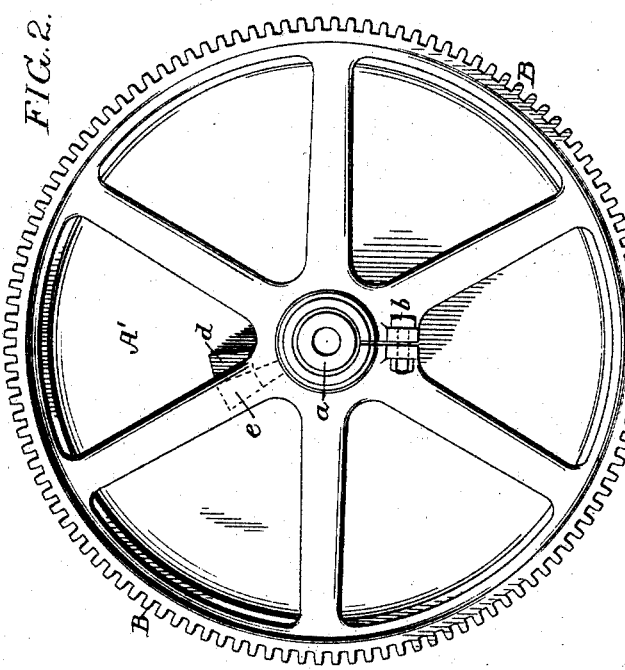
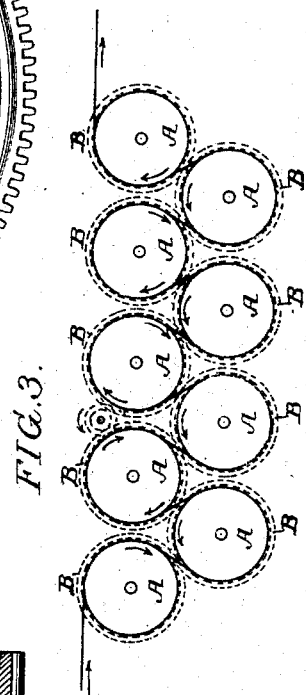
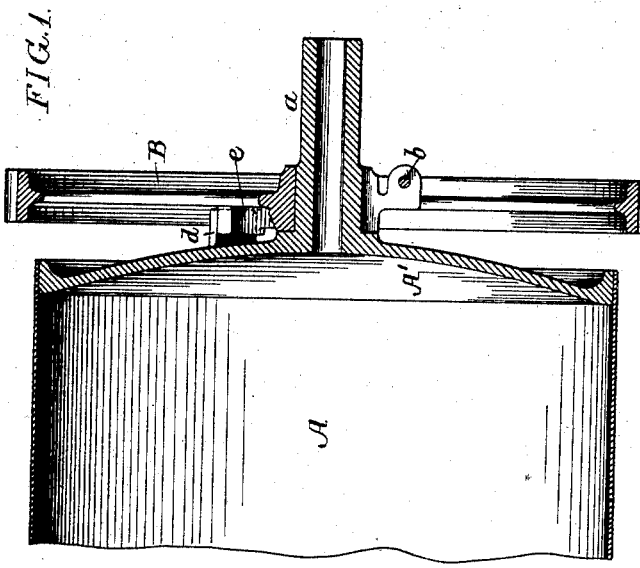
Witnesses:
Alex. Barkoff
R. Schleicher
Inventor:
William C. Mackinney
by his Attorneys
Howson & Howson

UNITED STATES PATENT OFFICE.

WILLIAM C. MACKINNEY, OF PHILADELPHIA, PENNSYLVANIA, ASSIGNOR TO THE H. W. BUTTERWORTH & SONS COMPANY, OF SAME PLACE.

DRIVING-GEAR FOR DRYING-ROLLS.

SPECIFICATION forming part of Letters Patent No. 503,380, dated August 15, 1893.

Application filed November 19, 1892. Serial No. 452,553. (No model.)

*To all whom it may concern:*

Be it known that I, WILLIAM C. MACKINNEY, a citizen of the United States, and a resident of Philadelphia, Pennsylvania, have invented certain Improvements in Driving-Gear for Drying-Rolls, of which the following is a specification.

The object of my invention is to make a simple and efficient connection between the driving wheels and cylinders of drying machines. This object I attain in the following manner, reference being had to the accompanying drawings, in which—

Figure 1, is a sectional view of sufficient of a drum and the driving wheel to illustrate my invention. Fig. 2, is a face view looking in the direction of the arrow, Fig. 1; and Fig. 3, is a diagram view showing the drying rolls.

In constructing drying machines of this class it is necessary that the fitting of the several parts should be as accurate as possible and run perfectly free, so that one cylinder will take the material from another without causing a slack, or placing too much tension upon the goods. The drums are usually driven from a central driving shaft, through the medium of a series of gear wheels, but the great difficulty has been to so mount and secure the gears upon the trunnions of the cylinder, that the gearing will run truly and smoothly and the cylinders will bear the proper relation to each other. Keys and set screws have commonly been used for this purpose, but are objectionable, as they cannot be set as required, and a set screw when tightened causes the wheel or gear to run out of true if the wheel or gear is not a very tight fit on the journal, and in most cases the wheel is comparatively loose in order that it may be removed from the shaft if repairs are necessary.

Referring to the drawings, A is the cylinder made in the usual manner, having a head A', on which is a trunnion a. This trunnion is tubular to allow for the passage of steam into the interior of the cylinder. On this trunnion is mounted a gear wheel B. This gear wheel is loosely mounted upon the trunnion when the parts are first put together, and can be tightly clamped thereto by a clamp bolt b, the hub of the gear wheel being split, so that the clamp bolt can draw the hub in such a manner as to clamp it tightly upon the trunnion. The gear wheel B meshes with another gear wheel in the series, and the series of gear wheels is driven from a central driving shaft, as clearly shown in the diagram Fig. 3.

In order to take the strain, and insure the proper relation between the drum and the gear wheel, I mount on the head A' of the cylinder a lug $d$, and I project from the wheel a lug $e$. These two lugs are preferably tapered, so as to insure the proper bearing of one against the other, and they overlap, as clearly shown in the drawings, so that when the teeth of the wheel are properly meshed with the teeth of the engaging gear, the drum is adjusted so that the lugs bear against each other, after which the clamping bolt is operated so as to clamp the wheel tightly upon the journal of the drum. Thus, when the parts are in motion, the strain is entirely taken by the lugs, which relieve the clamps from the usual severe strains owing to their being so near the center of rotation, and this arrangement is much superior to the key or set screw arrangement, inasmuch as the lugs present broad bearing surfaces, and are farther away from the center of rotation than would be the keys, which in ordinary machines of this character, soon cut out and become loose.

I claim as my invention—

1. In a drying machine, the combination with the rotating cylinder provided with a journal, of a gear loosely mounted on said journal, said cylinder and gear having on the same circumferential line lugs adapted to engage each other, with coupling mechanism for coupling the gear to said cylinder after adjustment, substantially as described.

2. In a drying machine having a series of rotating cylinders or drums provided with journals, of gears loosely mounted upon said journals, and having lugs adapted to engage with corresponding lugs upon the heads of said cylinders or drums, with the clamp by which the gear can be secured to the journal after adjustment, whereby the cylinders may be adjusted to rotate without lost motion between them, substantially as and for the purpose set forth.

In testimony whereof I have signed my name to this specification in the presence of two subscribing witnesses.

WILLIAM C. MACKINNEY.

Witnesses:
JOSEPH H. KLEIN,
HENRY HOWSON.